(12) United States Patent
Jagiella

(10) Patent No.: US 11,726,030 B2
(45) Date of Patent: Aug. 15, 2023

(54) SENSOR SYSTEM AND METHOD

(71) Applicant: Endress+Hauser Conducta GmbH+Co. KG, Gerlingen (DE)

(72) Inventor: Manfred Jagiella, Notzingen (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 129 days.

(21) Appl. No.: 17/153,048

(22) Filed: Jan. 20, 2021

(65) Prior Publication Data
US 2021/0223167 A1    Jul. 22, 2021

(30) Foreign Application Priority Data

Jan. 22, 2020   (DE) .................... 10 2020 101 490.2

(51) Int. Cl.
*G01N 21/25*   (2006.01)
*G06N 20/00*   (2019.01)

(52) U.S. Cl.
CPC .............. *G01N 21/25* (2013.01); *G06N 20/00* (2019.01)

(58) Field of Classification Search
CPC ........... G01N 21/25; G01N 2021/8416; G01N 33/18; G06N 20/00; G01D 3/08; G01D 21/00; G01D 21/02
See application file for complete search history.

(56) References Cited

U.S. PATENT DOCUMENTS

| | | | | |
|---|---|---|---|---|
| 11,560,279 B2* | 1/2023 | Matsukawa | ............ | G06K 15/16 |
| 2013/0332398 A1* | 12/2013 | Wu | ........ | G06N 20/00 |
| | | | | 706/12 |
| 2019/0034803 A1 | 1/2019 | Gotou | | |
| 2019/0167927 A1* | 6/2019 | Dagnello | ................ | A24F 40/60 |

FOREIGN PATENT DOCUMENTS

| | | |
|---|---|---|
| CN | 104280518 A | 1/2015 |
| CN | 107085117 A | 8/2017 |
| CN | 107810508 A | 3/2018 |
| CN | 110388952 A | 10/2019 |
| CN | 110494047 A | 11/2019 |
| EP | 2763065 A1 | 8/2014 |

* cited by examiner

*Primary Examiner* — Roy Y Yi
*Assistant Examiner* — Geoffrey T Evans
(74) *Attorney, Agent, or Firm* — Kelly J. Smith; Endress+Hauser (USA) Holding, Inc.

(57) ABSTRACT

The present disclosure relates to a sensor system having at least one measuring point having at least one first sensor and one measuring transducer. The first sensor is configured to output first sensor signals that are a function of a first measurand of a measuring medium present at the measuring point. The measuring transducer is connected to the first sensor in order to receive the first sensor signals and comprises an evaluation application which is configured to determine one additional piece of information that is different from the first measurand using an evaluation algorithm on the basis of at least the first sensor signals. The sensor system furthermore comprises a higher-level data processing structure, such as a server or a cloud. Both the higher-level data processing structure and the measuring transducer are configured to execute a training application configured to train the evaluation algorithm.

14 Claims, 1 Drawing Sheet

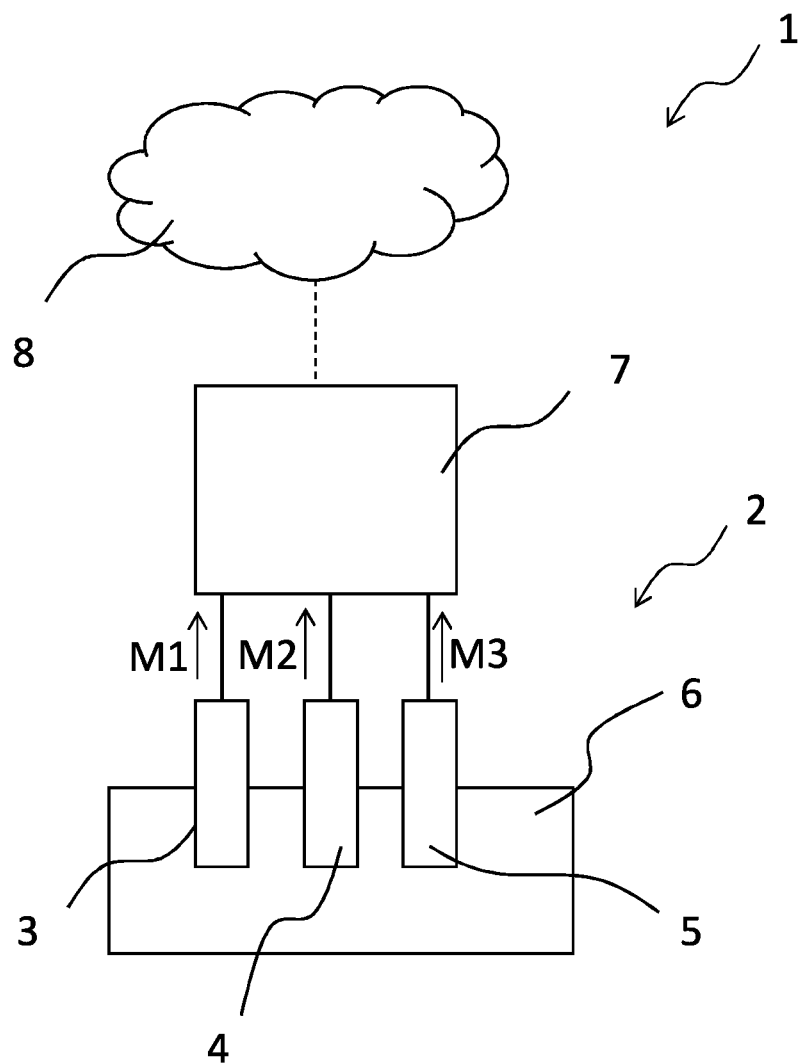

SENSOR SYSTEM AND METHOD

CROSS-REFERENCE TO RELATED APPLICATION

The present application is related to and claims the priority benefit of German Patent Application No. 10 2020 101 490.2, filed on Jan. 22, 2020, the entire contents of which are incorporated herein by reference.

TECHNICAL FIELD

The present disclosure relates to a sensor system having at least one measuring point having at least one first sensor and one measuring transducer. The present disclosure furthermore relates to a method for determining additional information that is different from a measurand of a measuring medium that can be determined by means of a first sensor, on the basis of at least first sensor signals of the first sensor that are a function of the first measurand.

BACKGROUND

Sensors for measuring and monitoring various measurands are frequently used in process or automation technology and in the laboratory. Examples of such sensors are fill-level sensors, flow sensors, pressure sensors, temperature sensors, and analytical sensors, such as pH sensors, conductivity sensors, turbidity sensors, ion-selective electrodes for determining ion concentrations, amperometric sensors for determining dissolved gases, optochemical sensors, for example for oxygen or pH measurement, photometric sensors or spectrometric sensors. The respective underlying measuring principles are known from the prior art and are not listed individually at this point.

A measuring point in the sense of the present application consists of one or more sensors which are used for detecting sensor signals representing a measurand, and a measuring transducer which can receive and further process the sensor signals of the sensors attached to the measuring transducer or connected thereto for communication. The further processing can include the determination of measured values of the measurands to be detected by the individual sensors, the further evaluation of the measured values, and/or the determination of additional information.

Additional information can be, for example, information about the state of the sensors or about a medium or a process monitored by the measuring point. Such additional information can be determined using KI algorithms, inter alia using sensor data which are made available by the sensors of the measuring point in the form of sensor signals. For example, additional information from sensor signals can be determined by machine classification. DE 10 2012 112784 A1, for example, discloses a method in which a sensor state is determined from various diagnostic parameters by means of a classifier. It is known from DE 10 2012 112782 to identify a process by means of a classifier in that the classifier assigns a measured value profile currently detected in the process or at least one or more features of the measured value profile to a predefined process class and determines a probability with which the current measured value profile represents a process of the process class.

The creation of an algorithm suitable for the KI-based determination of additional information, for example by means of machine classification based on sensor data, requires high storage and computing power and the processing of a plurality of training data for training the algorithm. A manufacturer of sensors has a large variety of training data which are suitable for creating an evaluation algorithm for obtaining additional information from sensor signals of the sensors provided by said manufacturer. It can, therefore, already offer trained evaluation algorithms based on these training data. On the other hand, in many applications in the process industry or in the laboratory, it may be that a user, i.e., a process operator, wants special additional information relating to his specific processes or wishes to monitor special processes which are only known to him in detail and for which only he has meaningful training data. It is also possible for a user to want to determine additional information on the basis of sensor data provided by sensors of different manufacturers. However, for technical, organizational, or legal reasons, it is often not possible or only possible with difficulty to amalgamate training data from manufacturers and various users of sensors or measuring points.

SUMMARY

It is therefore the object of the present disclosure to specify a sensor system and a method which enable an evaluation algorithm for obtaining additional information using sensor data from sensors of the sensor system to be flexibly adapted to the requirements of an individual measuring point, an individual measuring task, or an individual process.

The sensor system according to the present disclosure comprises at least one measuring point having at least one first sensor and one measuring transducer. The first sensor is configured to output first sensor signals that are a function of a first measurand of a measuring medium present at the measuring point. The measuring transducer is connected to the first sensor in order to receive the first sensor signals and comprises an evaluation application which is configured to determine at least one additional piece of information that is different from the first measurand using an evaluation algorithm on the basis of at least the first sensor signals. The sensor system furthermore comprises a higher-level data processing structure, such as a server or a cloud. Both the higher-level data processing structure and the measuring transducer are configured to execute a training application configured to train the evaluation algorithm.

As both the higher-level data processing structure and the measuring transducer are configured to execute the training application, the evaluation algorithm can selectively be trained using the higher-level data processing structure with high computing power on the basis of training data sets which are provided by the higher-level data processing structure and can originate from sensor manufacturers or other users, or (alternatively or additionally) using the locally installed measuring transducer on the basis of specific training data sets of the user of the measuring point, which can include a specific process, specific sensor combinations, or sensitive data of the user. This allows a high degree of flexibility in training the evaluation algorithm in order to thus enable an individual adaptation of the evaluation algorithm to the individual measuring point or its individual measuring task or to an industrial or laboratory process monitored by the measuring point.

Training may take place on the basis of a training data set of first sensor signals. The first sensor signals of the training data set may be test data detected by the first sensor or one or more sensors of the same type or historical sensor signals detected at the specific measuring point by the first sensor or a sensor of the same type. In addition, the training can comprise a check of the evaluation algorithm, obtained after training with the training data set, with a test data set that is different from the training data set. If the training of the evaluation algorithm is referred to below, an optional check with a separate test data set is included.

The first measurand may, for example, be a scalar measurand, such as a pH value, a concentration of a chemical substance in the measuring medium, a fill level, a flow rate, a temperature, or a pressure. The first measurand may also be a vector, e.g., a spectrum over a wavelength range with defined resolution.

Advantageously, the measuring point can comprise a plurality of sensors, such as, sensors of different types, wherein the sensor signals of all or some of the plurality of sensors are included in the determination of the additional information by means of the evaluation algorithm. The sensors of the measuring point can originate from different manufacturers. In this embodiment, the measuring transducer can be embodied as a multi-channel measuring transducer which can process the measurement signals of a plurality of different sensors simultaneously or in parallel. The measuring transducer may be configured to determine first measurands from the sensor signals. The measuring transducer can display the measurands determined from the sensor signals and the additional information.

For example, the measuring point can comprise at least one second sensor and optionally further sensors, wherein the second sensor and the optionally present further sensors are configured to output second and optionally further sensor signals, which are a function of a second measurand that is different from the first measurand and the additional information, and optionally further measurands of the measuring medium. The measuring transducer is connected to the second sensor and the optionally present further sensors in order to receive the second sensor signals and optionally further sensor signals. The evaluation application is configured to determine the additional information using the evaluation algorithm on the basis of the first and second sensor signals.

Like the first measurand, the second measurand may also be, for example, a scalar measurand, such as a pH value, a concentration of a chemical substance in the measuring medium, a fill level, a flow rate, a temperature, or a pressure. The second measurand may also be a vector, e.g., a spectrum over a wavelength range with defined resolution.

The training application can accordingly be configured to train the evaluation algorithm on the basis of a training data set comprising at least first and optionally also second or further sensor signals or signals of sensors of the same type.

In all these embodiments, a training data set can consist of training sensor signals and values of the additional information to be determined, said values being associated with the training sensor signals. From a plurality of training data sets, the evaluation algorithm can learn to assign a value of the additional information to specific sensor signals or combinations of specific sensor signals.

The measurands, of which the sensor signals included by the evaluation algorithm in the determination of the additional information are a function, are generally correlated with the additional information to be determined.

The additional information can be a further measurand of the measuring medium, e.g., a measurand that cannot be directly determined by sensors, or a qualitative characteristic of the measuring medium or information about the measuring point. As a qualitative characteristic, the additional information can represent, for example, a flavor or a flavor component, an odor or an odor component of the measuring medium. If the measuring point is a process measuring point, the additional information can represent a state of the process.

The evaluation algorithm can comprise a mapping rule, such as, a classifier, e.g., a neural network or a polynomial classifier, or a multivariate method, support vector machines, wherein the training application is configured to train coefficients of the mapping rule, such as, weightings of the classifier, or the parameterization of the multivariate method. As mentioned above, the training application can be furthermore configured to check the evaluation algorithm by means of a test data set.

The training application can be configured to perform a machine learning process, such as, of a supervised or an unsupervised learning process.

The sensor signals used for determining the additional parameter can include measured values or raw measured values of the measurand, photometric or spectrometric measured values, e.g., absorption or extinction, or data representing a spectrum.

The measuring transducer can be a conventional measuring transducer of the process industry, a compact measuring transducer, or a conventional computer, e.g., a tablet or a smartphone, which execute a software application providing measuring transducer functions for receiving and processing the sensor signals of the sensors and optionally for forwarding the sensor signals or the data derived therefrom.

The present disclosure furthermore relates to a method for determining additional information that is different from a first measurand of a measuring medium that can be determined using a first sensor, on the basis of at least first sensor signals of the first sensor that are a function of the first measurand. The method includes steps of detecting the first sensor signals of the first sensor, and determining the additional information using an evaluation application executed by a measuring transducer connected to the first sensor for communication, wherein the evaluation application determines the additional information using an evaluation algorithm on the basis of at least the first sensor signals. The evaluation algorithm is trained using a training application which is selectively executed in a higher-order data processing structure, such as, a server or a cloud, or in the measuring transducer.

The method can advantageously be carried out using the device described above.

Training may take place on the basis of a training data set of first sensor signals. The first sensor signals of the training data set may be test data detected by the first sensor or one or more sensors of the same type or historical sensor signals detected at the specific measuring point by the first sensor or a sensor of the same type. As mentioned above, the training can additionally comprise a check of the evaluation algorithm, obtained after training with the training data set, with a test data set that is different from the training data set.

The sensor signals of a plurality of sensors, such as, sensors of different types, can advantageously be included in the determination of the additional information by means of the evaluation algorithm. The sensors of the measuring point can originate from different manufacturers. The training data set is then correspondingly compiled in such a way that training data representing the behavior of the different sensors in a suitable manner are included in the training data set.

In the case of a plurality of sensors, the method may, for example, furthermore comprise a step of detecting at least second or further sensor signals of at least one second sensor connected to the measuring transducer for communication or, optionally, further sensors, wherein the second or further sensor signals are a function of a second measurand of the measuring medium that is different from the first measurand and the additional information, or further measurands of the measuring medium.

The additional information may be determined using the evaluation application, wherein the evaluation application determines the additional information using the evaluation algorithm on the basis of at least the first and second and optionally further sensor signals.

The evaluation algorithm can be trained on the basis of a training data set of first and second sensor signals using the training application which is selectively executed in the higher-level data processing structure, such as, the server or the cloud, and/or in the measuring transducer. The training application can train the evaluation algorithm on the basis of a training data set comprising at least first and optionally also second or further sensor signals or signals of sensors of the same type.

As already mentioned in connection with the sensor arrangement described above, the measurands, of which the detected sensor signals included by the evaluation algorithm in the determination of the additional information are a function, are generally correlated with the additional information to be determined.

The additional information can be a further measurand of the measuring medium, e.g., a measurand that cannot be directly determined by sensors, or a qualitative characteristic of the measuring medium or information about the measuring point. As a qualitative characteristic, the additional information can represent, for example, a flavor or a flavor component, an odor or an odor component of the measuring medium. If the measuring point is a process measuring point, the additional information can represent a state of the process.

The evaluation algorithm can comprise a mapping rule, such as, a classifier, e.g., a neural network or a polynomial classifier, or a multivariate method, wherein the training application is configured to train coefficients of the mapping rule, such as, weightings of the classifier, or the parameterization of the multivariate method. As mentioned above, the training application can be furthermore configured to check the evaluation algorithm using a test data set.

The training application may perform a machine learning process, such as, a supervised or an unsupervised learning process.

The evaluation algorithm, e.g., the classifier, can be trained offline or online. Offline training is understood to mean training before the performance of a process or a monitoring task in which the measuring point is used. In principle, this therefore involves training under laboratory conditions. In contrast, online training takes place in the process or during the monitoring task in which the measuring point is used.

The evaluation algorithm can be trained using the training application executed by the higher-level data processing structure, on the basis of a first training data set in order to generate a first version of the evaluation algorithm, wherein the first version of the evaluation algorithm is subsequently transmitted to the measuring transducer in order to be executed by the latter in order to determine the additional information.

The first version of the evaluation algorithm can be trained using the training application executed by the measuring transducer, on the basis of a second training data set that is different from the first training data set in order to generate a second version of the evaluation algorithm. Subsequently, the additional information can be determined by the measuring transducer on the basis of the second version of the evaluation algorithm.

The measuring transducer can determine a first value of the additional information on the basis of the first version of the evaluation algorithm and a second value of the additional information on the basis of the second version of the evaluation algorithm and display them for a user. On the basis of the display, a user can decide whether the first or the second value of the additional information is more appropriate and accordingly select the use of the first or the second version of the evaluation algorithm for the continuation of the monitoring of the process or of a medium by means of the measuring point.

It is also possible for the measuring transducer to forward to the higher-level data processing structure the results of a comparison between the first value obtained with the first version of the evaluation algorithm and the second value obtained with the second version of the evaluation algorithm, so that the higher-level data processing structure can include the comparison results in further training of the evaluation algorithm.

The evaluation algorithm can be trained by the higher-level data processing structure by means of the training application, wherein the training data set used for this purpose comprises sensor signals of sensors of the same type, which signals were detected at different measuring points in order to determine the same additional information. The higher-level data processing structure, embodied for example as a cloud or as a server, can be connected to the various measuring points in order to receive data of the measuring points and can compile from the data specific training data sets for training evaluation algorithms for determining specific additional information.

BRIEF DESCRIPTION OF THE DRAWING

FIG. 1 shows an exemplary embodiment according to the present disclosure.

DETAILED DESCRIPTION

FIG. 1 shows a sensor arrangement 1 with a measuring point 2 which is formed from three sensors 3, 4, 5 and a measuring transducer 7. The sensors 3, 4, 5 are installed in a process 6, e.g., in a pipe or container carrying a process medium. The sensors 3, 4, and 5 are configured to generate digital sensor signals M1, M2, M3 which are each a function of a measurand of the process medium, hereinafter also referred to as measuring medium, and to output them to the measuring transducer 7 for further processing. The measuring transducer 7 has a processor and data memory which comprise operating and evaluation programs and which are configured to execute said computer programs. The measuring transducer 7 can be connected to a higher-level data processing structure 8 for communication. This connection may, but need not, be permanent. The higher-level data processing structure 8 can be a cloud or a single server.

The measuring transducer 7 is configured in a conventional manner to determine and display first measurands determined from the sensor signals M1, M2, M3 by means of the sensors 3, 4, 5. Such measurands can be, for example, scalar measurands, such as a pH value, a concentration of a chemical substance in the measuring medium, a fill level, a flow rate, a temperature, a pressure, or an absorption or extinction of a measurement radiation of a specific wavelength. The measurand can also be a vector, e.g., a spectrum over a wavelength range with defined resolution. This first measurand are measurands, which are provided by a single sensor in each case.

The measuring transducer 7 comprises a computer program which serves to execute an evaluation algorithm. The evaluation algorithm is configured to determine additional information from one or more or all of the sensor signals M1, M2, and M3. Said additional information can be a further measurand of the measuring medium, e.g., a measurand that cannot be directly determined by sensors, or a qualitative characteristic of the measuring medium or information about the measuring point. If the measuring point is a process measuring point, the additional information can represent a state of the process.

Both the measuring transducer 7 and the higher-level data processing structure 8 comprise a training application designed as software, which is configured to train the evaluation algorithm for determining the additional information. The sensor arrangement 1 thus offers the possibility of training the evaluation algorithm with high computing power in the higher-level data processing structure 8 on the basis of, as a rule, large training data sets provided by said higher-level data processing structure. At the same time, the sensor arrangement 1 offers the possibility of training the evaluation algorithm by the (local) measuring transducer 7 of the measuring point 2. The local measuring transducer 7 may not have as much training data available as the data processing structure 8. The computing power of the local measuring transducer 7 is also usually lower than that of the higher-order data processing structure 8. On the other hand, specific measuring point data or user data are available to the local measuring transducer 7, which data allow more precise training of the evaluation algorithm with regard to the individual measuring task or to the circumstances of the individual measuring point 7 or the specific behavior of the process 6.

Specifically, the evaluation algorithm can thus be trained by means of the training application, for example in the following variants: 1) training only by the higher-level data processing structure 8; 2) training only by the measuring transducer 7; 3) training by the higher-level data processing structure 8, subsequent further training by the measuring transducer 7; or 4) training by the measuring transducer 7, subsequent further training by the higher-level data processing structure 8.

Of course, the measuring transducer 7 and the data processing structure 8 can also exchange training data with one another.

Furthermore, it is possible, in the context of training or further training (variant 2, 3, or 4), for the measuring transducer to download from the data processing structure 8 a test data set provided by the data processing structure 8, in order to check the evaluation algorithm obtained on the basis of a training data set. This test data set can originate from laboratory measurements, from historical data of the measuring point 2, or from historical data of other comparable measuring points communicating with the data processing structure 8.

The additional information can represent, for example, a measurand or characteristic of the measuring medium that cannot be directly determined by sensors. The sensor 3 can, for example, be a spectrometer, the sensor 4 a pressure sensor, and the sensor 5 a temperature sensor. The additional information can be derived by means of the evaluation algorithm from the sensor signals M1 supplied by the spectrometer, which represent a spectrum of the measuring medium in a specific wavelength range (e.g., UV/Vis). Advantageously, the evaluation algorithm can additionally take into account the sensor signals M2 and M3 of the pressure and temperature sensors. On the basis of the data, the evaluation algorithm can, as additional information, qualitatively or quantitatively determine a specific analyte that is not directly detectable by sensors in the measuring medium.

Alternatively, the evaluation algorithm can also determine from the sensor signals M1, M2, M3 as additional information a qualitative characteristic of the measuring medium, e.g., an odor or a flavor or an odor or flavor component. Such flavor components can, for example, be "sweet," "bitter," "sour," "salty," and others. The evaluation algorithm can additionally or alternatively also be trained to derive certain error states from the sensor signals M1, M2, and M3 as additional information. Such an error state can be, for example, the presence of undesirable foreign substances or light-scattering particles in the measuring medium.

A training data set can consist of training sensor signals and values of the additional information to be determined, said values being associated with the training sensor signals. From a plurality of training data sets, the evaluation algorithm can learn to assign a value of the additional information to specific sensor signals or combinations of specific sensor signals. In the following, some examples from various fields of application in the process industry are given by way of illustration.

In the water/waste water sector, the evaluation algorithm can serve to identify error states, e.g., burst pipes, the entry of solid particles, e.g., sand, algae, or bacteria, from sensor data of the measuring point as additional information.

In the food processing engineering sector, the evaluation algorithm can serve to identify quality parameters of the process media from sensor data of the measuring point 2 as additional information. For example, for a measuring point 2 in a process plant in which various beverages are produced, the evaluation algorithm can identify the measuring medium currently present at the measuring point as additional information, e.g., as "cleaning agent," "beverage 1," "beverage 2," etc. The detection of error states is also possible.

In the chemical or pharmaceutical process engineering sector, the evaluation algorithm can serve to identify error states, e.g., the presence of undesirable foreign substances, leaks, etc., from sensor data of the measuring point as additional information.

In the field of life sciences, the evaluation algorithm can serve to ascertain, as additional information from sensor data of the measurement site, parameters not directly measurable by sensors, e.g., the population or density of living cells, the concentration of a process product or metabolic product produced by the cells.

The training application can also be designed to recognize redundant sensors of the measuring point and to output the information. For example, it can be indicated to the user that one of the sensors 3, 4, or 5 is not required for determining the additional information. The user may then decide to remove the redundant sensor from the measuring point.

Although FIG. 1 shows a measuring point with three sensors, the present disclosure is not limited to this configuration. It is also possible for only a single or any other number of sensors to be provided. Examples of sensors for use in the sensor system according to the present disclosure are individual or arbitrary combinations of the sensors mentioned below: Fill-level sensors, flow sensors, pressure sensors, temperature sensors, and analytical sensors, such as pH sensors, conductivity sensors, turbidity sensors, ion-selective electrodes for determining ion concentrations, amperometric sensors for determining dissolved gases, optochemical sensors, for example for oxygen or pH measurement, photometric sensors, or spectrometric sensors.

The invention claimed is:

1. A sensor system having at least one measuring point, comprising:
    wherein the sensor system has at least one first sensor and one measuring transducer;
    wherein the first sensor is configured to output first sensor signals that are a function of a first measurand of a measuring medium present at the measuring point;
    wherein the measuring transducer is connected to the first sensor in order to receive the first sensor signals and comprises an evaluation application which is configured to determine at least one additional piece of information that is different from the first measurand using an evaluation algorithm based on at least the first sensor signals; and
    wherein the sensor system furthermore comprises a higher-level data processing structure, wherein both the higher-level data processing structure and the measuring transducer are configured to execute a training application configured to train the evaluation algorithm;
    wherein the higher-level data processing structure is provided with a first training data set for training the evaluation algorithm and wherein the measuring transducer is provided with a second training data set which is a specific training set of the user of the measuring point.

2. The sensor system of claim 1, wherein the additional information is a further measurand of the measuring medium, or a qualitative characteristic of the measuring medium, or information about the first measuring point.

3. The sensor system of claim 1, wherein the additional information represents a flavor or a flavor component, an odor or an odor component of the measuring medium.

4. The sensor system of claim 1, wherein the first measuring point is a process measuring point and wherein the additional information represents a state of the process.

5. The sensor system of claim 1, wherein the evaluation algorithm comprises a mapping rule and
    wherein the training application is configured to train coefficients of the mapping rule.

6. The sensor system of claim 1, wherein the measuring point comprises at least one second sensor configured to output second sensor signals which are a function of a second measurand of the measuring medium that is different from the first measurand and the additional information;
    wherein the measuring transducer is connected to the second sensor in order to receive the second sensor signals; and
    wherein the evaluation application is configured to determine the additional information by means of the evaluation algorithm on the basis of the first and second sensor signals.

7. The sensor system of claim 6, wherein the training application is configured to train the evaluation algorithm on the basis of a training data set comprising at least first sensor signals.

8. A method for determining additional information that is different from a first measurand of a measuring medium that can be determined using a first sensor based on at least first sensor signals of the first sensor that are a function of the first measurand, wherein the method comprises the following steps:
    detecting the first sensor signals of the first sensor;
    determining the additional information using an evaluation application executed by a measuring transducer connected to the first sensor for communication, wherein the evaluation application determines the additional information using an evaluation algorithm on the basis of at least the first sensor signals; and
    wherein the evaluation algorithm is trained using a training application which is selectively executed in a higher-order data processing structure
    wherein the higher-level data processing structure is provided with a first training data set for training the evaluation algorithm and wherein the measuring transducer is provided with a second training data set which is a specific training set of the user of the measuring point.

9. The method of claim 8, further comprising:
    detecting second sensor signals of at least one second sensor connected to the measuring transducer for communication, wherein the second sensor signals are a function of a second measurand of the measuring medium that is different from the first measurand and the additional information; and
    determining the additional information using the evaluation application, wherein the evaluation application determines the additional information using the evaluation algorithm on the basis of at least the first and second sensor signals.

10. The method of claim 8, wherein the evaluation algorithm is trained using the training application executed by the higher-level data processing structure, on the basis of a first training data set in order to generate a first version of the evaluation algorithm, and wherein the first version of the evaluation algorithm is subsequently transmitted to the measuring transducer in order to be executed by the latter in order to determine the additional information.

11. The method of claim 10, wherein the first version of the evaluation algorithm is trained using the training application executed by the measuring transducer based on a second training data set that is different from the first training data set to generate a second version of the evaluation algorithm.

12. The method of claim 11, wherein, subsequently, the additional information is determined by the measuring transducer on the basis of the second version of the evaluation algorithm.

13. The method of claim 11, wherein the measuring transducer determines a first value of the additional information on the basis of the first version of the evaluation algorithm and a second value of the additional information on the basis of the second version of the evaluation algorithm and displays them for a user.

14. The method of claim 8, wherein the evaluation algorithm is trained by the higher-level data processing structure using the training application, wherein the training data set used for this purpose comprises sensor signals of sensors of the same type which were detected at different measuring points in order to determine the same additional information.

* * * * *